United States Patent
Hatti et al.

(10) Patent No.: US 7,545,898 B2
(45) Date of Patent: Jun. 9, 2009

(54) SYSTEM AND METHOD FOR CLOCK RATE DETERMINATION

(75) Inventors: Mallinath Hatti, Bangalore (IN); Lakshmanan Ramakrishnan, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 776 days.

(21) Appl. No.: 10/779,231

(22) Filed: Feb. 13, 2004

(65) Prior Publication Data

US 2005/0180537 A1   Aug. 18, 2005

(51) Int. Cl.
*H04L 7/00* (2006.01)

(52) U.S. Cl. ............... 375/355; 375/356; 375/373; 375/370; 375/293; 375/294; 375/376

(58) Field of Classification Search ............ 375/316, 375/372, 118, 355, 356, 373, 376, 370, 293, 375/294, 256; 327/91, 94; 341/200; 328/75; 455/403

See application file for complete search history.

(56) References Cited

U.S. PATENT DOCUMENTS

| 4,672,639 | A * | 6/1987 | Tanabe et al. | 375/371 |
|---|---|---|---|---|
| 6,556,640 | B1 * | 4/2003 | Baba | 375/376 |
| 6,577,167 | B1 * | 6/2003 | Soda | 327/91 |
| 2001/0024478 | A1 * | 9/2001 | Sasada | 375/316 |
| 2004/0028159 | A1 * | 2/2004 | Abdelilah et al. | 375/350 |
| 2004/0203559 | A1 * | 10/2004 | Stojanovic et al. | 455/403 |

* cited by examiner

*Primary Examiner*—Shuwang Liu
*Assistant Examiner*—Kabir A Timory
(74) *Attorney, Agent, or Firm*—McAndrews Held & Malloy Ltd.

(57) ABSTRACT

Presented herein are systems and methods for clock rate determination. A bitstream is sampled by sampling a transmitted clock signal at a rate corresponding to a receiver clock signal, and measuring an average number of consecutive samples that have a same state selected from a first state and a second state.

11 Claims, 5 Drawing Sheets

SYSTEM AND METHOD FOR CLOCK RATE DETERMINATION

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In a communication system, a data bitstream is transmitted at a particular bit rate. The data bitstream transitions from high to low, or vice versa, responsive to a clock signal at the transmitter.

However, the receiver operates on a receiver clock signal that has a different period, and phase relationship with the transmitter clock signal. Accordingly, sampling the data signal at the rate of the receiver clock signal is not suitable.

Additionally, the ratio of the receiver clock signal to the transmitter clock signal is likely to be a mixed number (number comprising the sum of an integer and a fraction). As a result, sampling the data signal after a fixed number of receiver clock signal edges may also be unsuitable.

Further limitations and disadvantages of conventional and traditional approaches will become apparent to one of skill in the art, through comparison of such systems with embodiments presented in the remainder of the present application with references to the drawings.

BRIEF SUMMARY OF THE INVENTION

Presented herein are systems and methods for clock rate determination.

In one embodiment, there is presented a method for sampling a bitstream. The method comprises sampling a transmitted signal at a rate corresponding to a receiver clock signal, and measuring an average number of consecutive samples that have a same state selected from a first state and a second state.

In another embodiment, there is presented a method of sampling a bistream. The method comprises measuring a ratio between a receiver clock signal and a transmitter clock signal, wherein the ratio comprises a sum of an integer N and a fraction f; sampling the bitstream after N edges of the receiver clock signal; adding the fraction f to an accumulated value; adding the accumulated value to the integer N and the fraction; sampling the data bistream after N edges, if a sum of the fraction and the accumulated value are less than one; and sampling the data bitstream after N+1 edges, if the sum of the fraction and the accumulated value are more than one.

In another embodiment, there is presented a system for sampling a bitstream. The system comprises a first circuit and a second circuit. The first circuit samples a transmitted signal at a rate corresponding to a receiver clock signal. The second circuit measures an average number of consecutive samples that have a same state selected from a first state and a second state.

In another embodiment, there is presented a system for sampling a bitstream. The system comprises a first circuit, a second circuit, an accumulator register, and an adder. The first circuit measures a ratio between a receiver clock signal and a transmitter clock signal, wherein the ratio comprises a sum of an integer N and a fraction f. The second circuit samples the bitstream after N edges of the receiver clock signal. The accumulator register stores an accumulated value. The adder adds the fraction f to the accumulated value and adds the accumulated value to the integer N and the fraction. If a sum of the fraction and the accumulated total are less than one, the second circuit samples the data bitstream after N edges. If the sum of the fraction and the accumulated total are more than one, the second circuit samples the data bitstream after N+1 edges.

Further limitations and disadvantages of conventional and traditional approaches will become apparent to one of skill in the art, through comparison of such systems with embodiments presented in the remainder of the present application with references to the drawings.

DETAILED DESCRIPTION OF THE INVENTION

Figure 1:
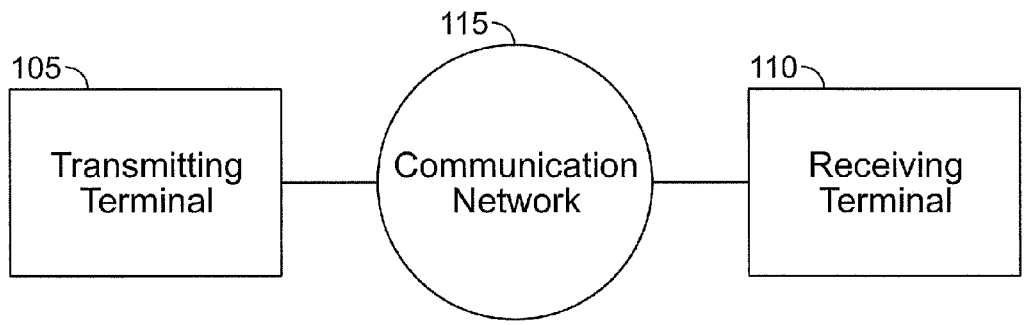
FIG. 1 is a block diagram of a communication system in accordance with an embodiment of the present invention.

Referring now to FIG. 1, there is illustrated a block diagram of a communication system in accordance with an embodiment of the present invention. The communication system comprises a transmitting terminal 105 and a receiving terminal 110. The transmitting terminal 105 transmits a digital data signal over a communication network 115. The communication network 115 can comprise any combination of communications media, such as cables, wireless links, the public switched telephone network, or the internet, to name a few. The receiving terminal 110 receives the digital data signal from the communication network 115.

The digital data signal can include a serial data bitstream and a transmitted at transmitter clock signal rate. The serial data bitstream comprises data bits that are transmitted at a particular bit rate. The transmitter signal transitions from a high state to a low state, and from the low state to the high state, at the bit rate.

The receiving terminal 110 is driven by a receiver clock signal. The receiver clock signal has a different rate and phase relationship from the transmitter clock signal. Accordingly, the receiving terminal 110 extracts the rate of the transceiver clock signal and samples the data signal at the rate of the transceiver clock signal.

Figure 2:
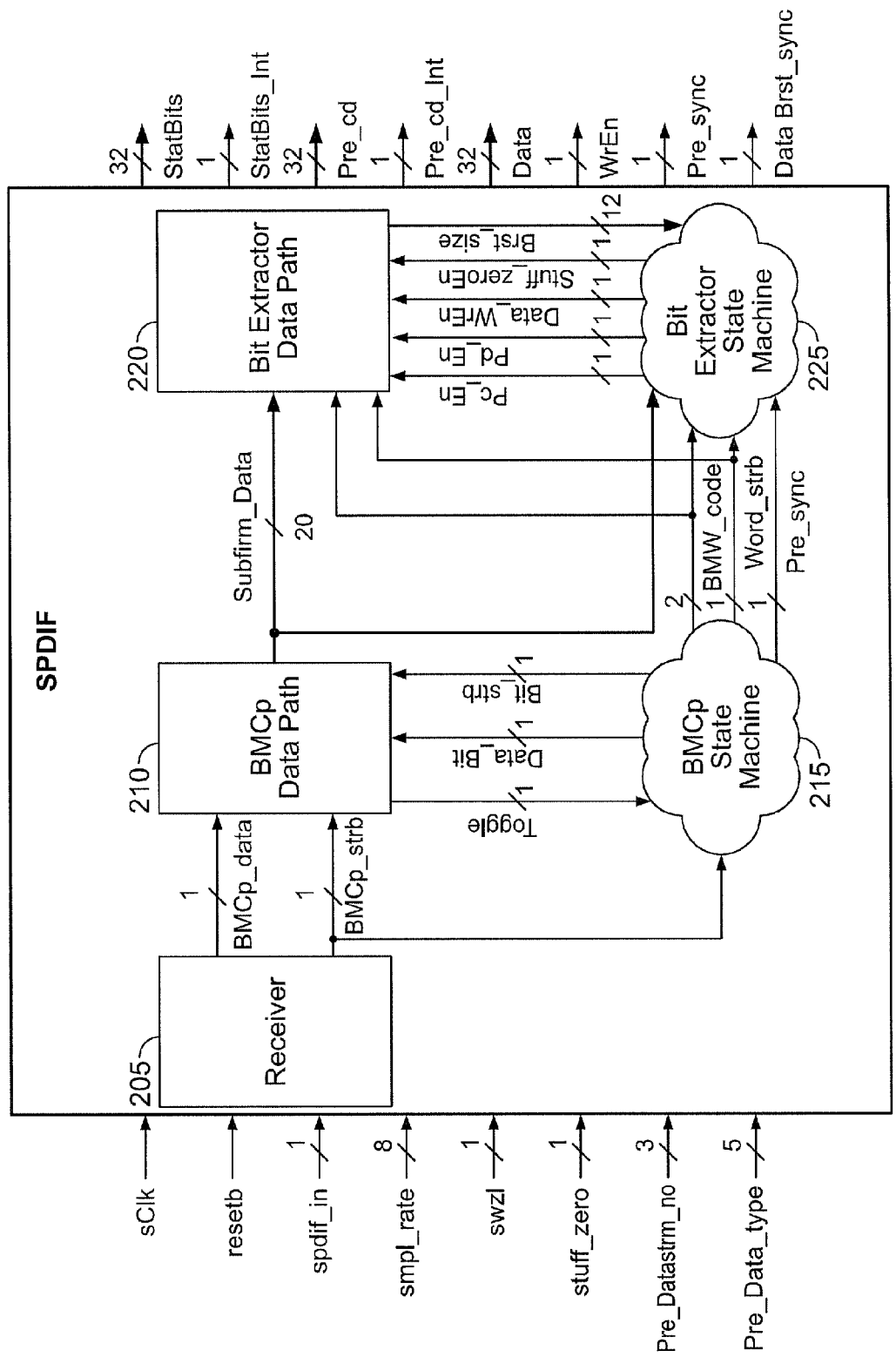
FIG. 2 is a block diagram of an exemplary receiver in accordance with an embodiment of the present invention.

Referring now to FIG. 2, there is illustrated a block diagram of an exemplary receiving terminal 110 in accordance with an embodiment of the present invention. The receiving terminal 110 comprises a receiver 205, a biphase mark code (BMC) data path 210, a decoded BMC state machine 215, a bit extractor data path 220, and a bit extractor state machine 225.

The receiver 205 synchronizes the serial data bitstream with the receiver clock and checks for data transition. The period of synchronized serial data bitstream transition depends on the sample rate (the ration of the decoding frequency and two times the encoding frequency) programmed. Potentially, the data transition period can be more than two receiver clocks. Depending on the sample rate, the jittered accumulator based clock is derived from the serial data bitstream. The serial data bitstream is sampled with the derived clock and in synchronization with the receiver clock. The receiver 205 works at a sampling rate as low as 2. The BMC data along with non-BMC preamble data are decoded from the serial data bitstream, resulting in the decoded BMC data, BMCp_data. The decoded BMC data BMCp_data is a sequence of half cells collected serially. Two half cells constitute one data bit. The receiver 205 also generates a strobe signal BMCp_strobe to indicate the validity of the decoded BMC data BMCp_data.

The decoded BMC data machine 215 seeks a synchronization preamble pattern. Once a synchronization pattern is achieved, the decoded BMC data machine 215 outputs a corresponding code indicating the particular synchronization preamble pattern detected.

The bit extractor data path 220 module puts the status bit from each sub-frame data word into a shift register at every sub-frame data word strobe goes high. If 32 such status bits are collected, then status bits interrupt is generated. The bit extractor data path 220 outputs preamble Pc and Pd data values. Pc, Pd are valid when active high Pre_cd_Int interrupt is generated. If the programmed data type and bit stream number matches with the data type and bit stream number which are parsed from the bit stream data, then the following data pay load is parsed and outputted. From each sub-frame data 16-bits of valid non-PCM encoded or uncompressed PCM are collected. Since the Main FIFO width is 32, to match the width of the Main FIFO, two sets of such 16-bits data's are combined and sent out as a 32-bit output data from the SPDIF module. This 16-bit to 32-bit conversion is done in this module. The 32-bit output data is swizzled before being sent out if the swizzle input signal status is high, or else output data is sent directly.

Bit extractor data path state machine 225 seeks sync word1 Pa (F872h) and the consecutive sync word2 Pb (4E1Fh). If Pa and Pb sync are achieved, then the data burst sync status signal goes high. After the data burst sync status signal goes high, burst info Pc and code length Pd are parsed and valid Pc, Pd values are indicated by the interrupt generated from the bit extractor data path 220. Always valid payload data burst is followed by these four fields (Pa, Pb, Pc & Pd). If the programmed data type and bit stream number matches with the parsed data type and bit stream number from the audio stream, then payload data is parsed. The total number of valid sub-frames in the payload data burst is found from Pd. If stuff zero input signal status is high then at the end of the payload data burst one 32-bit (all zero bits) is outputted from SPDIF module. Since different data type like Dolby AC-3 and MPEG streams have fixed repetition rates, the stuffed zero data will be transmitted at the end of the payload data burst. This stuffed data is parsed and thrown till the next Pa, Pb, Pc and Pd fields are found.

The receiver 205 extracts the rate of the transmitter clock signal by sampling the transmitter signal at the rate of the receiver clock a statistically significant number of times, such as, for example, 512 times. The receiver 205 calculates the average number of receiver clock cycles that the transmitter signal is in the same state, high or low. The average number of receiver clock cycles that the transmitter signal is in the same state is the data rate of the serial data bitstream.

Figure 3:
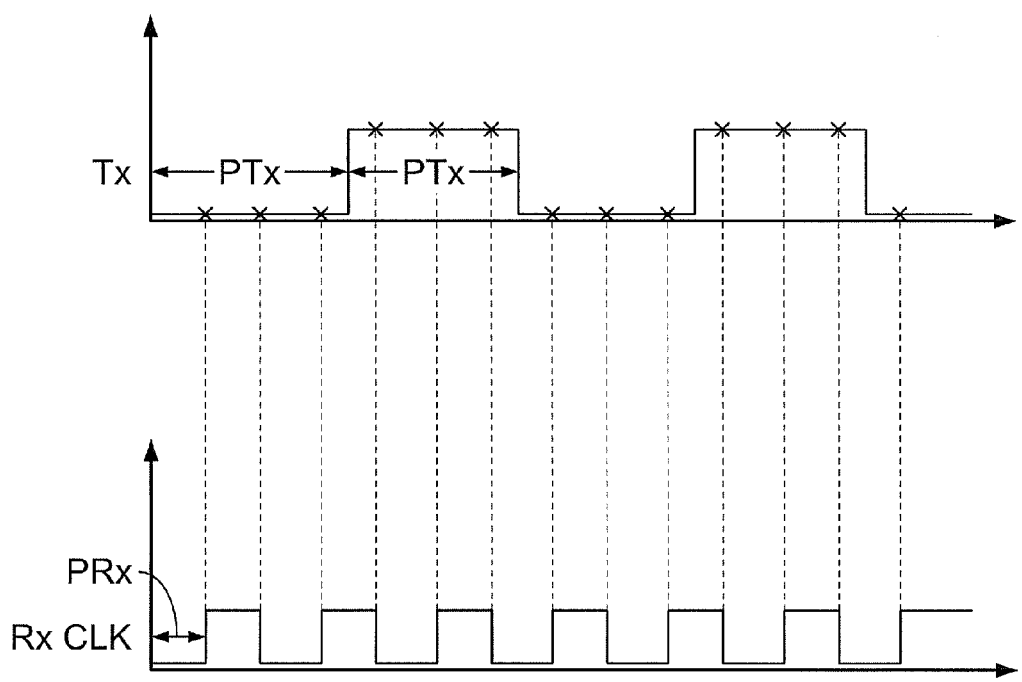
FIG. 3 is a block diagram describing the sampling of a transmitter clock signal in accordance with an embodiment of the present invention.

Referring now to FIG. 3, there is illustrated a block diagram describing the sampling of a transmitter signal in accordance with an embodiment of the present invention. The transmitter signal Tx alternates between a high state and a low state over a period of time, PTx. When the transmitter signal TX transitions from high to low, or vice versa, the serial data bitstream can also change values.

The receiver 205 includes a receiver clock signal Rx CLK that also alternates between a high state and a low state over a period of time, PRx. The receiver clock signal Rx CLK may have a different rate and phase relationship with the transmitter signal Tx.

The receiver 205 extracts the rate of the transmitter clock signal by sampling the transmitter signal at the rate of the receiver clock Rx CLK a statistically significant number of times, such as, for example, 512 times. The receiver clock Rx CLK is usually faster than the transmitter clock Tx CLK, by a factor that is the sum of an integer N, and a fraction f. When sampling at the receiver clock Rx CLK rate, either N−1, N, or N+1 consecutive samples will be at one state, followed by either N−1, N, or N+1 samples at the other state. The factor (N+f) can be approximated by averaging the number of consecutive samples that are at a particular state over a statistically significant time period.

Figure 4:
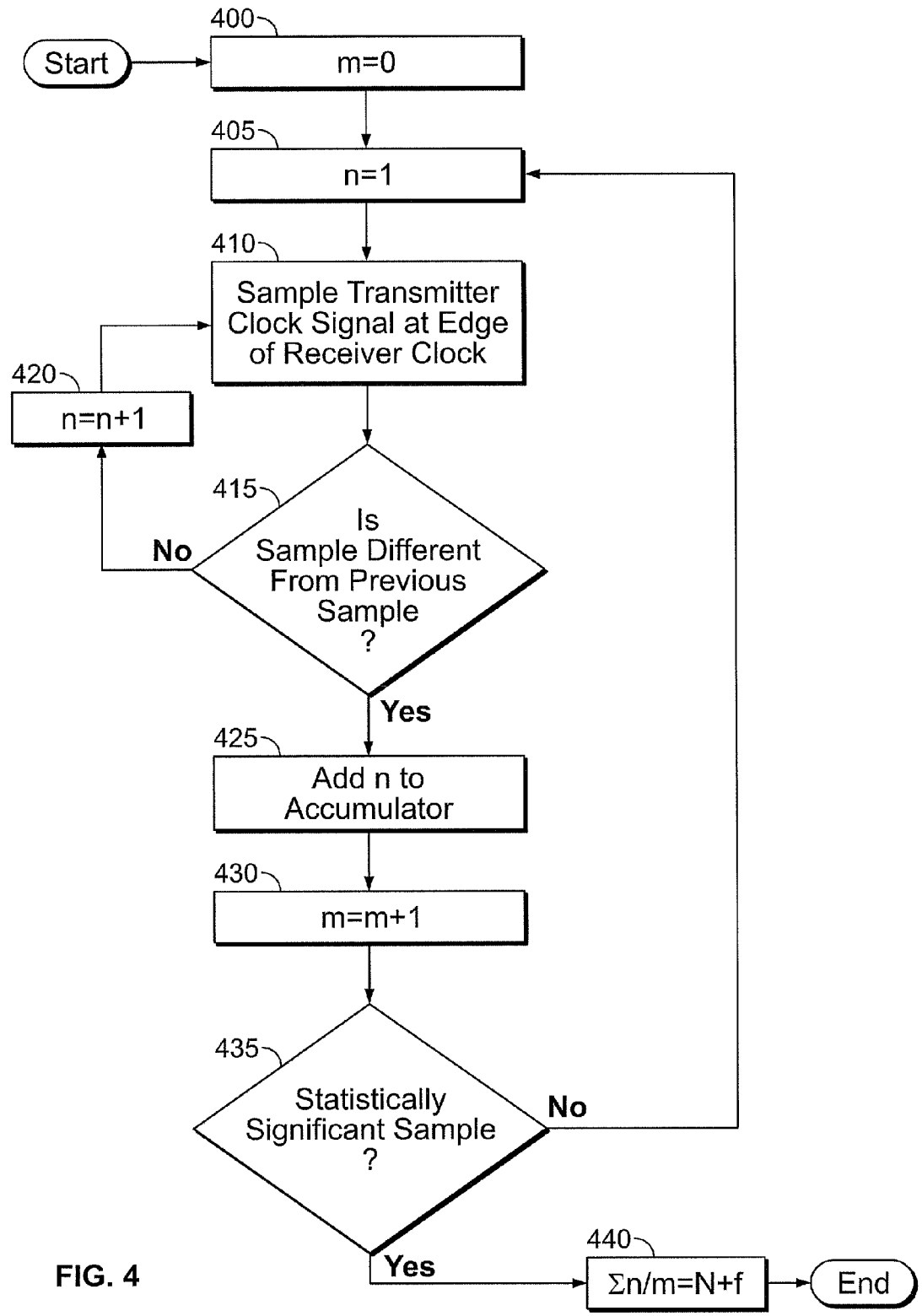
FIG. 4 is a flow diagram for determining a clock speed in accordance with an embodiment of the present invention.

Referring now to FIG. 4, there is illustrated a flow diagram for extracting the rate of the transmitter clock Tx CLK. At 400, a value m measuring the transitions is set to 0. At 405, a value n is set equal to 1. At 410 the receiver 205 takes a sample of the Tx signal at the rising or falling edge of the receiver clock signal Rx CLK. At 415, a determination is made whether the sample is different from a previous sample taken during a previous rising or falling edge of the receiver clock signal Rx CLK.

If the sample taken during 410 is the same as a previous sample taken during a previous rising or falling edge of the receiver clock signal Rx CLK, the value n is incremented at 420. After incrementing the value n, 410 is repeated.

If the sample taken during 410 is different from a previous sample taken during a previous rising or falling edge of the receiver clock signal Rx CLK, the value n is added to an accumulator at 425. At 430, the value m is incremented, and 405 is repeated.

The foregoing, 405-430, is repeated for a statistically significant number of samples (determination 435). After the statistically significant number of samples are taken, the accumulated value, Σn is divided by m (440), resulting in an integer N and a fraction f. The quotient during 440 is an approximation of the ratio between the receiver clock signal Rx CLK and the transmitter clock signal Tx CLK.

The serial data bitstream is sampled with the receiver clock signal Rx CLK, every N or N+1 periods PRx. The serial data bitstream can be sampled every N periods PRx, wherein after each sampling, the fractional portion is accumulated. When the accumulation of the fractional portions exceeds one, the serial data bitstream is sampled after N+1 periods, and one is subtracted from the accumulation of the fractional portions.

Figure 5:
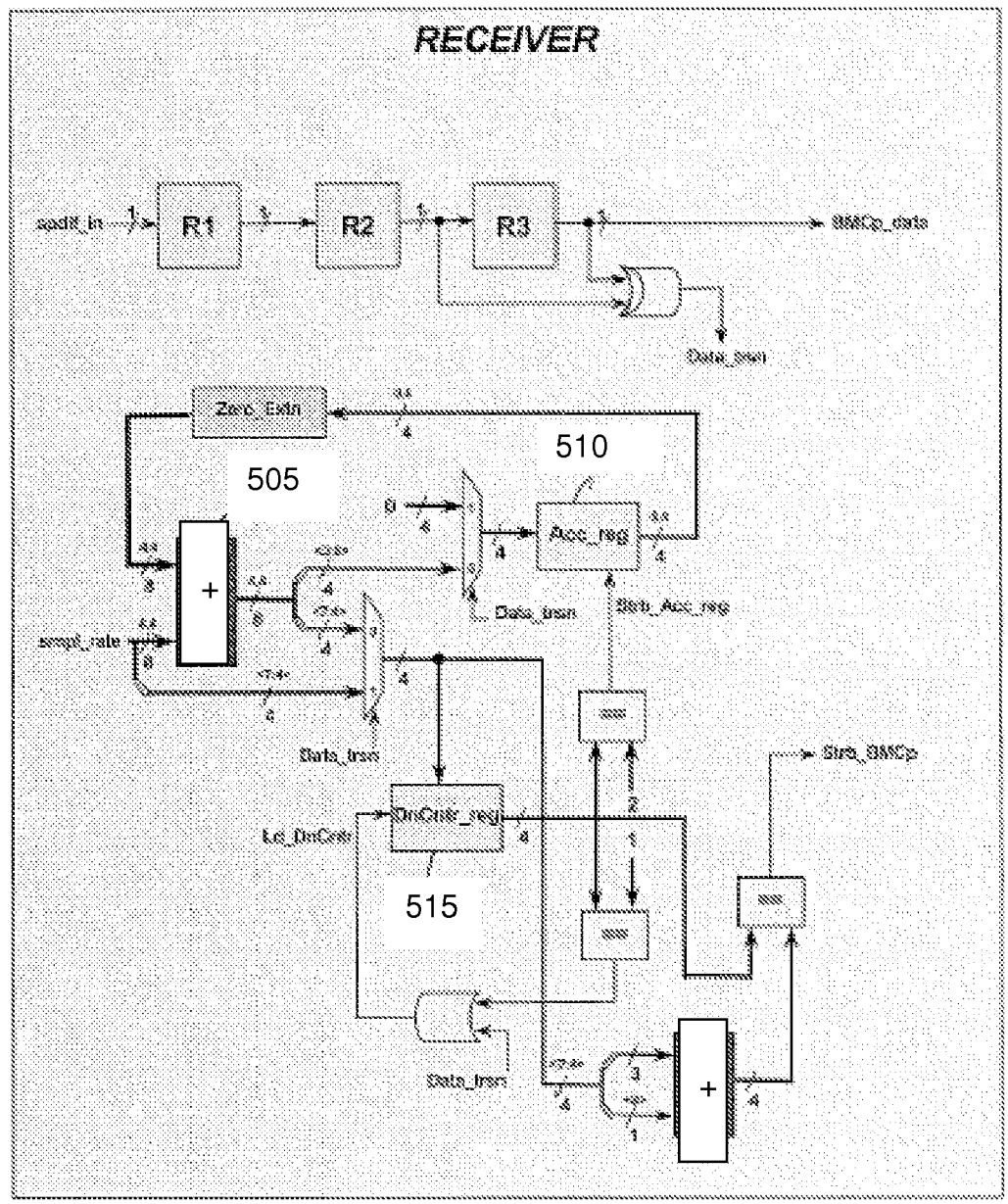
FIG. 5 is a block diagram of an exemplary receiver in accordance with an embodiment of the present invention.

Referring now to FIG. 5, there is illustrated a block diagram of an exemplary receiver 205 in accordance with an embodiment of the present invention. The receiver 205 comprises an adder 505, an accumulator register 510, and a down counter register 515. The adder 505 receives the contents of the accumulator register 510 and an eight bit value representing the N+f, wherein the four most significant bits represent N and the four least significant bits represent f.

The adder 505 adds the contents of the accumulator register 510 and N+f. The accumulator register 510 stores the fractional portion of the sum, while the down counter register 515 stores the integer portion of the sum. At each receiver clock signal Rx CLK rising edge, the down counter register 515 decrements. When the down counter 515 decrements, the receiver 205 generates a data strobe signal, Strb_BMCp, to the decoded BMC data path 210. Responsive to the Strb_BMCp signal, the decoded BMC data path 210 samples the serial data bitstream, BMCp_data.

When the receiver 205 generates the data strobe signal, Strb_BMCp, the adder 505 again adds the contents of the accumulator register 510 to N+f. Initially, the accumulator register 510 stores a zero value. However, after the first iteration, the accumulator register 510 stores f. After the second iteration, the adder 505 adds N+f to the contents of the accumulator register 510, f, resulting in N+f+f. The integer portion of N+f+f is either N or N+1, while the fractional portion is either f+f, or f+f−1.

Figure 6:
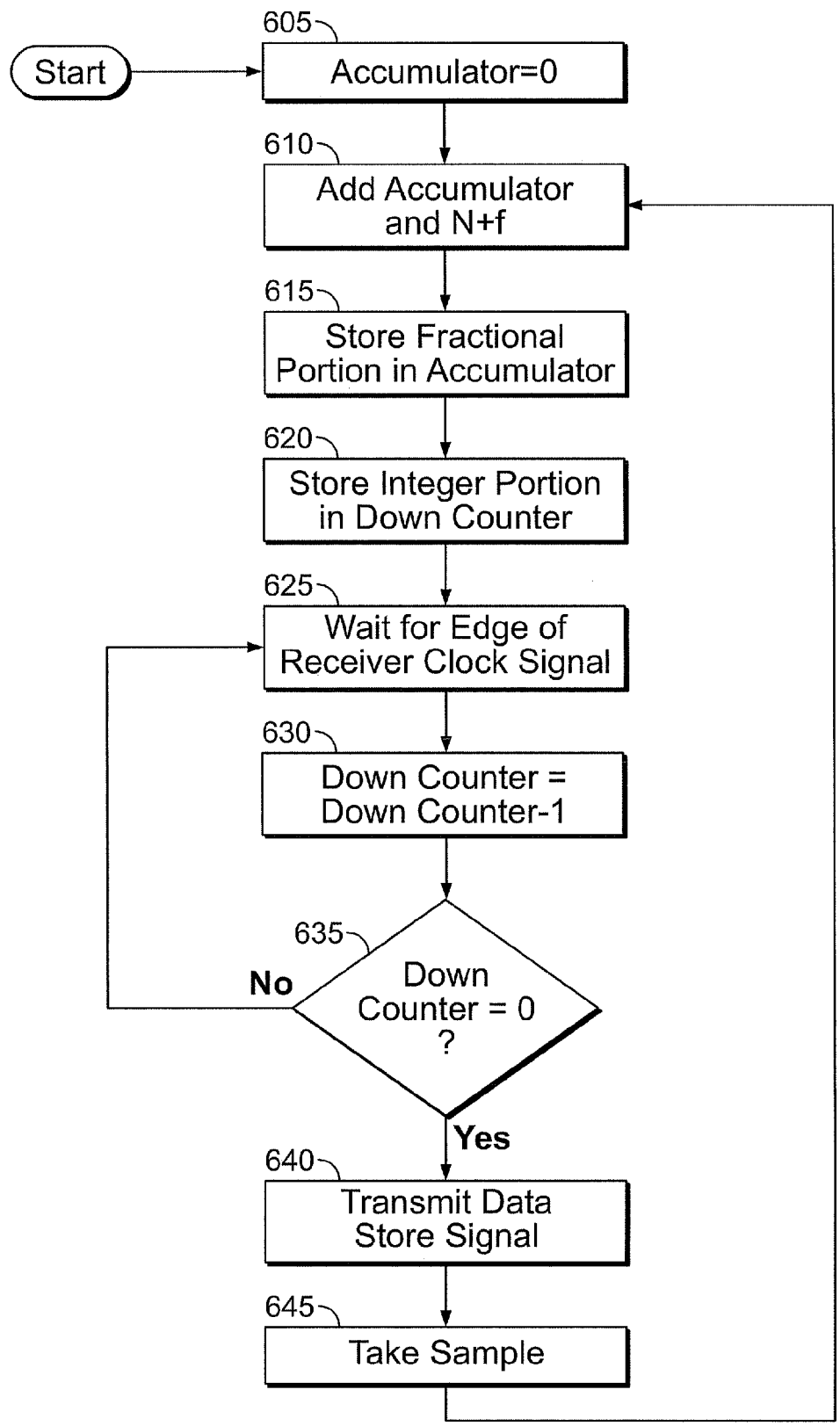
FIG. 6 is a flow diagram for sampling a serial data bitstream in accordance with an embodiment of the present invention.

Referring now to FIG. 6, there is illustrated a flow diagram for sampling the serial data bitstream in accordance with an embodiment of the present invention. At 605, the accumulator register 510 is initialized with a zero value. At 610, the adder adds the ratio of the receiver clock signal Rx CLK to the contents of the accumulator register 510. The accumulator register 510 stores the fractional portion of the sum (615) while the down counter register 515 stores the integer portion of the sum (620).

At 625, the receiver 205 waits for an edge of the receiver clock signal Rx CLK. At each edge of the receiver clock signal Rx CLK, the down counter register 515 decrements (630). The foregoing 625-630, is repeated until the down counter is zero at 635. When the down counter register 515 reaches zero, the receiver 205 transmits a strobe signal at 640. The strobe signal causes the decoded BMC data path 210 to sample (645) the serial data bitstream.

The methods and systems described herein may be implemented as a board level product, as a single chip, application specific integrated circuit (ASIC), or within varying levels of the decoder system and/or integrated with other portions of the system as separate components.

The degree of integration of the decoder system will primarily be determined by speed and cost considerations. Because of the sophisticated nature of modern processors, it is possible to utilize a commercially available processor, which may be implemented external to an ASIC implementation.

Alternatively, if the processor is available as an ASIC core or logic block, then a commercially available processor can be implemented as part of an ASIC device wherein certain operations are implemented in firmware.

While the invention has been described with reference to certain embodiments, it will be understood by those skilled in the art that various changes may be made and equivalents may be substituted without departing from the scope of the invention.

In addition, many modifications may be made to adapt a particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A method for sampling a bitstream, said method comprising:

sampling a transmitted signal at a rate corresponding to a receiver clock signal; and measuring an average number of consecutive samples that have a same state selected from a first state and a second state;

wherein measuring the average number of consecutive samples that have the same state selected from a first state and a second state comprises:

incrementing a count if a particular sample has the same state from a previous sample; and accumulating the count if the particular sample has a different state from the previous sample.

2. The method of claim 1, wherein sampling the transmitted signal further comprises sampling the transmitted signal a statistically significant number of times.

3. A method of sampling a bitstream, said method comprising:

measuring a ratio between a receiver clock signal and a transmitter signal, wherein the ratio comprises a sum of an integer N and a fraction f;

sampling the bitstream after N edges of the receiver clock signal;

adding the fraction f to an accumulated value;

adding the accumulated value to the integer N and the fraction;

sampling the data bitstream after N edges, if a sum of the fraction and the accumulated value are less than one; and sampling the data bitstream after N+1 edges, if the sum of the fraction and the accumulated value are more than one.

4. The method of claim 3, further comprising:

setting the accumulated value as the sum of the accumulated value and the fraction, if the sum of the accumulated value and the fraction is less than one; and setting the accumulated value as the sum of the accumulated value and the fraction minus one, if the sum of the accumulated value and the fraction is more than one.

5. A system for sampling a bitstream, said system comprising:

a first circuit for sampling a transmitted signal at a rate corresponding to a receiver clock signal; and a second circuit for measuring an average number of consecutive samples that have a same state selected from a first state and a second state; and wherein measuring the average number of consecutive samples that have the same state selected from a first state and a second state comprises:

incrementing a count if a particular sample has the same state from a previous sample; and accumulating the count if the particular sample has a different state from the previous sample.

6. The system of claim 5, wherein sampling the transmitted signal further comprises sampling the transmitted signal a statistically significant number of times.

7. A system for sampling a bitstream, said system comprising:

a first circuit for measuring a ratio between a receiver clock signal and a transmitter signal, wherein the ratio comprises a sum of an integer N and a fraction f;

a second circuit for sampling the bitstream after N edges of the receiver clock signal;

an accumulator register for storing an accumulated value;

an adder for adding the fraction f to the accumulated value and adding the accumulated value to the integer N and the fraction;

the second circuit sampling the data bitstream after N edges, if a sum of the fraction and the accumulated total are less than one; and the second circuit sampling the data bitstream after N+1 edges, if the sum of the fraction and the accumulated total are more than one.

8. The system of claim 7, wherein:

the adder sets the accumulated value as the sum of the accumulated value and the fraction, if the sum of the accumulated value and the fraction is less than one; and the adder sets the accumulated value as the sum of the accumulated value and the fraction minus one, if the sum of the accumulated value and the fraction is more than one.

9. The system of claim 7, further comprising:

a down counter register for storing the integer N from the adder.

10. The system of claim 9, wherein the down counter decrements after each edge of the receiver clock signal.

11. The system of claim 10, further comprising:

a third circuit for generating a signal to the second circuit, when the down counter register stores a zero value.

* * * * *